United States Patent [19]

Takada et al.

[11] Patent Number: 4,995,284

[45] Date of Patent: Feb. 26, 1991

[54] ACCUMULATOR CONTROL DEVICE FOR HYDRAULIC CONTROL DEVICE FOR AUTOMATIC TRANSMISSION FOR VEHICLE WITH ENGINE LOAD DEPENDENT BACKUP CONTROL

[75] Inventors: Mitsuru Takada; Hiroshi Itoh, both of Toyota; Tokuyuki Takahashi, Aichi; Makoto Funahashi, Toyota, all of Japan

[73] Assignee: Toyota Jidosha Kabushiki Kaisha, Toyota, Japan

[21] Appl. No.: 388,515

[22] Filed: Aug. 2, 1989

[30] Foreign Application Priority Data

| Aug. 2, 1988 | [JP] | Japan | 63-192965 |
| Nov. 11, 1988 | [JP] | Japan | 63-285137 |
| Nov. 21, 1988 | [JP] | Japan | 63-294409 |

[51] Int. Cl.$^5$ ............................................. F16H 61/12
[52] U.S. Cl. ........................................ 74/868; 74/869
[58] Field of Search ...................... 74/866, 868, 869

[56] References Cited

U.S. PATENT DOCUMENTS

| 4,709,597 | 12/1987 | Yasue et al. | 74/868 |
| 4,722,247 | 2/1988 | Shindo et al. | 74/866 |
| 4,722,250 | 2/1988 | Sumiya et al. | 74/868 |
| 4,729,265 | 3/1988 | Sugano | 74/868 |
| 4,807,496 | 2/1989 | Hayasaki et al. | 74/866 |
| 4,827,805 | 5/1989 | Moan | 74/867 |
| 4,889,016 | 12/1989 | Kuwayama | 74/868 |

FOREIGN PATENT DOCUMENTS

| 58-152961 | 9/1983 | Japan . |
| 61-149657 | 7/1986 | Japan . |
| 0153045 | 7/1986 | Japan | 74/866 |

Primary Examiner—Leslie A. Braun
Assistant Examiner—Khoi Q. Ta
Attorney, Agent, or Firm—Oblon, Spivak, McClelland, Maier & Neustadt

[57] ABSTRACT

A hydraulic control device for generating a hydraulic pressure for a back pressure chamber of an accumulator in a speed stage shifting device of an automatic transmission for a vehicle such as an automobile is adapted to generate a hydraulic pressure to be supplied to the back pressure chamber of the accumulator by modulating the so-called line hydraulic pressure according to a balance between the modulated pressure itself and the line hydraulic pressure or more desirably an engine power simulation pressure modulated from the line hydraulic pressure to be lower than the line hydraulic pressure in low engine output operation under an influence of a signal hydraulic pressure controlled by an electromagnetic valve, wherein the signal hydraulic pressure decreases to substantially zero when the electromagnetic valve fails, and the accumulator control valve has a spool element having a first pressure receiving area exposed to the modulated hydraulic pressure to generate a positive feedback effect of decreasing the modulated hydraulic pressure along with increase thereof and a second pressure receiving area so that the accumulator control valve variably operates even when the signal pressure has decreased to zero exposed to the line hydraulic pressure or the engine power simulation pressure to generate an effect of increasing the modulated pressure, the first pressure receiving area having an effective pressure responsive sectional area substantially equal in the magnitude and opposite in the orientation to that of the second pressure receiving area.

4 Claims, 3 Drawing Sheets

ACCUMULATOR CONTROL DEVICE FOR HYDRAULIC CONTROL DEVICE FOR AUTOMATIC TRANSMISSION FOR VEHICLE WITH ENGINE LOAD DEPENDENT BACKUP CONTROL

BACKGROUND OF THE INVENTION

1. Field of the Invention

The present invention relates to a hydraulic control device for an automatic transmission for a vehicle such as an automobile, and more particularly, to an accumulator control device for controlling a back pressure of an accumulator incorporated in such a hydraulic control device for improving the speed stage shifting performance of the transmission.

2. Description of the Prior Art

It is conventionally practiced to provide an accumulator in a passage for supplying a servo hydraulic pressure to a hydraulically operating friction engaging means such as a clutch or a brake for switching over speed stages of a speed change device such as a planetary gear type speed change device, so as to adjust the servo hydraulic pressure effectively supplied to a servo chamber of the friction engaging means. It is also known to provide a back pressure chamber in the accumulator and to variably control the performance of the accumulator by a control of the hydraulic pressure supplied to the back pressure chamber, as described in, for example, Japanese Patent Laying-open Publication No. 58-152961 and Japanese Patent Laying-open Publication No. 61-149657.

The supply of a hydraulic pressure to the back pressure chamber of the accumulator of the kind described above is controlled by an accumulator control valve. When the accumulator control valve is constructed to be supplied with a signal hydraulic pressure modulated by an electromagnetic valve and to provide a hydraulic pressure for controlling the back pressure of the accumulator according to the signal hydraulic pressure, a fine back pressure control for the accumulator is available by a computer which electrically operates the electromagnetic valve.

However, in such a conventional accumulator control system, if the electromagnetic valve for modulating the signal hydraulic pressure to be supplied to said signal port of the accumulator control valve fails due to a disconnection of a wire, etc., said signal port will be continually supplied with a maximum or a minimum constant pressure, and in accordance with this the hydraulic pressure generated by the accumulator control valve for controlling the back pressure chamber of the accumulator increases to a maximum constant pressure or decreases to a minimum constant pressure, and therefore the back pressure of the accumulator is not controlled according to the output power of the engine, resulting in a serious deterioration of the speed stage shifting performance of the transmission due to an improper operation of the accumulator.

SUMMARY OF THE INVENTION

The object of the present invention is to provide an accumulator control device which controls the back pressure of the accumulator in accordance with a signal hydraulic pressure modulated by an electromagnetic valve when it operates in normal condition and still controls the back pressure of the accumulator in accordance with the output of the engine when the electromagnetic valve has failed.

According to the present invention, the above-mentioned object is accomplished by a hydraulic control device for an accumulator in a speed stage shifting device of an automatic transmission for a vehicle such as an automobile, comprising:

an electromagnetic valve for generating a first hydraulic pressure having a pressure level characteristic for primarily determining a hydraulic pressure to be supplied to a back pressure chamber of said accumulator according to an electric signal supplied thereto;

an accumulator control valve for generating a second hydraulic pressure to be supplied to the back pressure chamber of said accumulator by modulating a source hydraulic pressure according a balance between said second hydraulic pressure itself and a third hydraulic pressure available in said automatic transmission as having a pressure level characteristic of increasing or decreasing along with increase or decrease of engine output power under an influence of said first hydraulic pressure so that said second hydraulic pressure increases or decreases along with increase or decrease of said third hydraulic pressure under said influence of said first hydraulic pressure, wherein said accumulator control valve has a spool element having a first pressure receiving area exposed to said second hydraulic pressure to provide a positive feedback effect of decreasing said second hydraulic pressure along with increase thereof and a second pressure receiving area exposed to said third hydraulic pressure, said first pressure receiving area having an effective pressure responsive sectional area which generates a first force under said second hydraulic pressure, said second pressure receiving area having an effective pressure responsive sectional area which generates a second force substantially equal in the magnitude thereof and opposite in the direction thereof to said first force under said third hydraulic pressure.

According to the above-mentioned hydraulic control device for an accumulator, when the electromagnetic valve operates normally, the hydraulic pressure for the back pressure chamber of the accumulator is available in a manner of being primarily under the control of the electromagnetic valve, i.e. an electric computer control device with a modification of reflecting variation of engine output power, and when the electromagnetic valve fails because of a wire disconnection or the like, the hydraulic pressure for the back pressure chamber of the accumulator is available in a manner of being under the control of said third hydraulic pressure so as still to reflect variation engine output power.

In the hydraulic control device for an accumulator of the above-mentioned construction, said electromagnetic valve may be a normally open type solenoid valve which generates said first hydraulic pressure from a source hydraulic pressure therefor so as to increase along with increase of a duty ratio of energization thereof, and said accumulator control valve may modulate said source hydraulic pressure therefor so as to decrease or increase the pressure level of said second hydraulic pressure along with increase or decrease of the pressure level of said first hydraulic pressure.

The line hydraulic pressure available in the automatic transmission generally increases or decreases along with increase or decrease of engine output power. Therefore, the line hydraulic pressure can be used directly for the hydraulic pressure to be supplied to the back pressure chamber of the accumulator. However, since the line pressure characteristic is generally designed to provide an appropriate pressure level to meet with engine output power in medium to high engine output power operation, the line hydraulic pressure in low engine output power operation is generally too high relative to engine output power to be directly supplied to the back pressure chamber of the accumulator. Therefore, it is more desirable that the pressure level for the back pressure chamber of the accumulator is modified to be decreased from the line hydraulic pressure in low engine output power operation. The accumulator control valve of the above-mentioned construction decreases the pressure level of said second hydraulic pressure as modulated from the line hydraulic pressure according to said third hydraulic pressure under an additional but originally primary control by said electromagnetic valve.

Further, in order more desirably to control said second hydraulic pressure so as more faithfully reflect variation of engine output power, the hydraulic control device for an accumulator according to the present invention may further comprise an engine power simulation pressure control valve for generating said third hydraulic pressure as modulated from the line hydraulic pressure according to a throttle pressure available in said automatic transmission as having a pressure level characteristic of increasing or decreasing along with increase or decrease of engine output power so that said third hydraulic pressure increases or decreases at higher rate along with increase or decrease of engine output power than said line hydraulic pressure in low engine output power operation, or in other word, so that said third hydraulic pressure is modulated from the line hydraulic pressure so as to be lower than the line hydraulic pressure in low engine output power operation.

BRIEF DESCRIPTION OF THE DRAWINGS

In the accompanying drawings.

DESCRIPTION OF THE PREFERRED EMBODIMENT

In the following the invention will be described in detail with respect to a preferred embodiment thereof with reference to the accompanying drawings.

Figure 1:
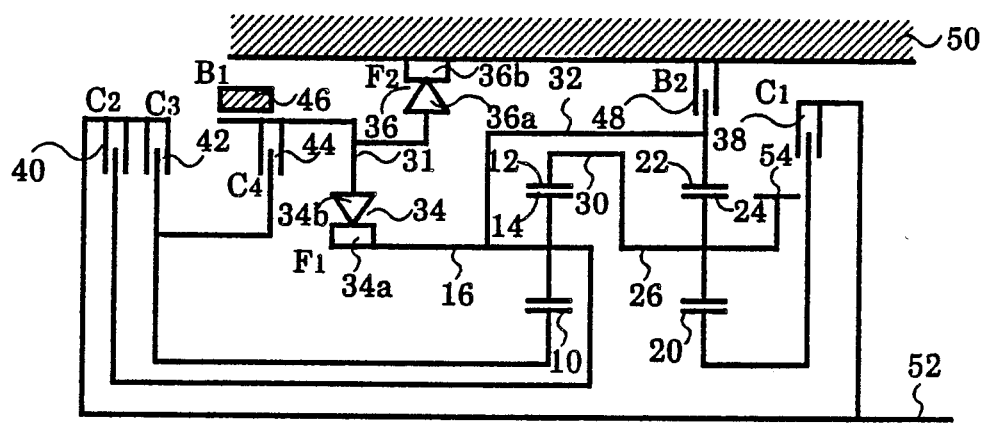
FIG. 1 is a skeleton diagram showing an embodiment of a planetary gear type speed stage shifting device of an automatic transmission for a vehicle such as an automobile to which a hydraulic control device including the accumulator control device according to the present invention is applicable.

Referring to FIG. 1, the speed stage shifting mechanism herein shown comprises a first planetary gear mechanism having a first sun gear 10, a first ring gear 12 coaxial with said first sun gear 10, a first planetary pinion 14 meshing with said first sun gear 10 and said first ring gear 12, and a first carrier 16 rotatably supporting said first planetary pinion 14, and a second planetary gear mechanism having a second sun gear 20, a second ring gear 22 coaxial with said second sun gear 20, a second planetary pinion 24 meshing with said second sun gear 20 and said second ring gear 22, and a second carrier 26 rotatably supporting said second planetary pinion 24. The first ring gear 12 is connected with the second carrier 26 by a connecting member 30. The first carrier 16 is connected with the second ring gear 22 by a connecting member 32.

A first one way clutch 34 and a second one way clutch 36 are provided in series between a housing 50 and the first carrier 16 which is also connected with the second ring gear 22 by the connecting member 32. The first one way clutch 34 is closer to the first carrier 16 and the second one way clutch 36 is closer to the housing 50. In more detail, the first one way clutch 34 has an inner race 34a connected with the first carrier 16 and an outer race 34b connected via a connecting member 31 with an inner race 36a of the second one way clutch which also has an outer race 36b connected with the housing 50. The first one way clutch 34 is engaged when the outer race 34b would rotate relative to the inner race 34a in in a first rotational direction and slips when the inner race 34a rotates relative to the outer race 34b in a second direction opposite to said first direction. Similarly, the second one way clutch 36 is engaged when the inner race 36a would rotate relative to the outer race 36b in said first direction and slips when the inner race 36a rotates relative to the outer race 36a in said second direction.

The second carrier 26 is connected with an annular gear member 54 which operates as an output rotational member of this speed stage shifting mechanism.

A first clutch 38 is provided between the second sun gear 20 and an input shaft 52 for selectively connecting these two members with one another. A second clutch 40 is provided between the first carrier 16 and the input shaft 52 for selectively connecting these two members with one another. A third clutch 42 is provided between the first sun gear 10 and the input shaft 52 for selectively connecting these two members with one another. A fourth clutch 44 is provided between the first sun gear 10 and the connecting member 31 for selectively connecting the sun gear 10 with the outer race 34b of the one way clutch 34 and the inner race 36b of the one way clutch 36.

A first brake 46 is provided between the connecting member 31 and the housing 50 for selectively fixing the connecting member 31 relative to the housing 50. A second brake 48 is provided between the combination of the second ring gear 22 and the first carrier 16 and the housing 50 for selectively fixing the second ring gear 22 and the first carrier 16 with respect to the housing 50.

The manner of providing a first speed stage, a second speed stage, a third speed stage (direct connection stage), a fourth speed stage (overdrive stage) and a reverse stage is shown in Table 1. In Table 1 a circle (O) indicates that the corresponding clutch, brake or one way clutch is engaged in engine drive state, and in Table 1 a circle in parentheses ((O)) indicates that the corresponding clutch or brake is engaged to provide the corresponding speed stage with the effect of engine braking.

When the ratio of the number of gear teeth of the first ring gear 12 to that of the first sun gear 10 is r₁, and the ratio of the number of gear teeth of the second ring gear 22 to that of the second sun gear 20 is r₂, speed change gear ratios at the respective speed stages are as shown in Table 2.

The first clutch 38, the second clutch 40, the third clutch 42, the fourth clutch 44, the first brake 46 and the second brake 48 are all of a hydraulically operating type having hydraulic pressure chambers and are adapted to be engaged when a hydraulic pressure is supplied to the hydraulic pressure chambers and are disengaged when the hydraulic pressure has been exhausted from the hydraulic pressure chambers.

Figure 2:
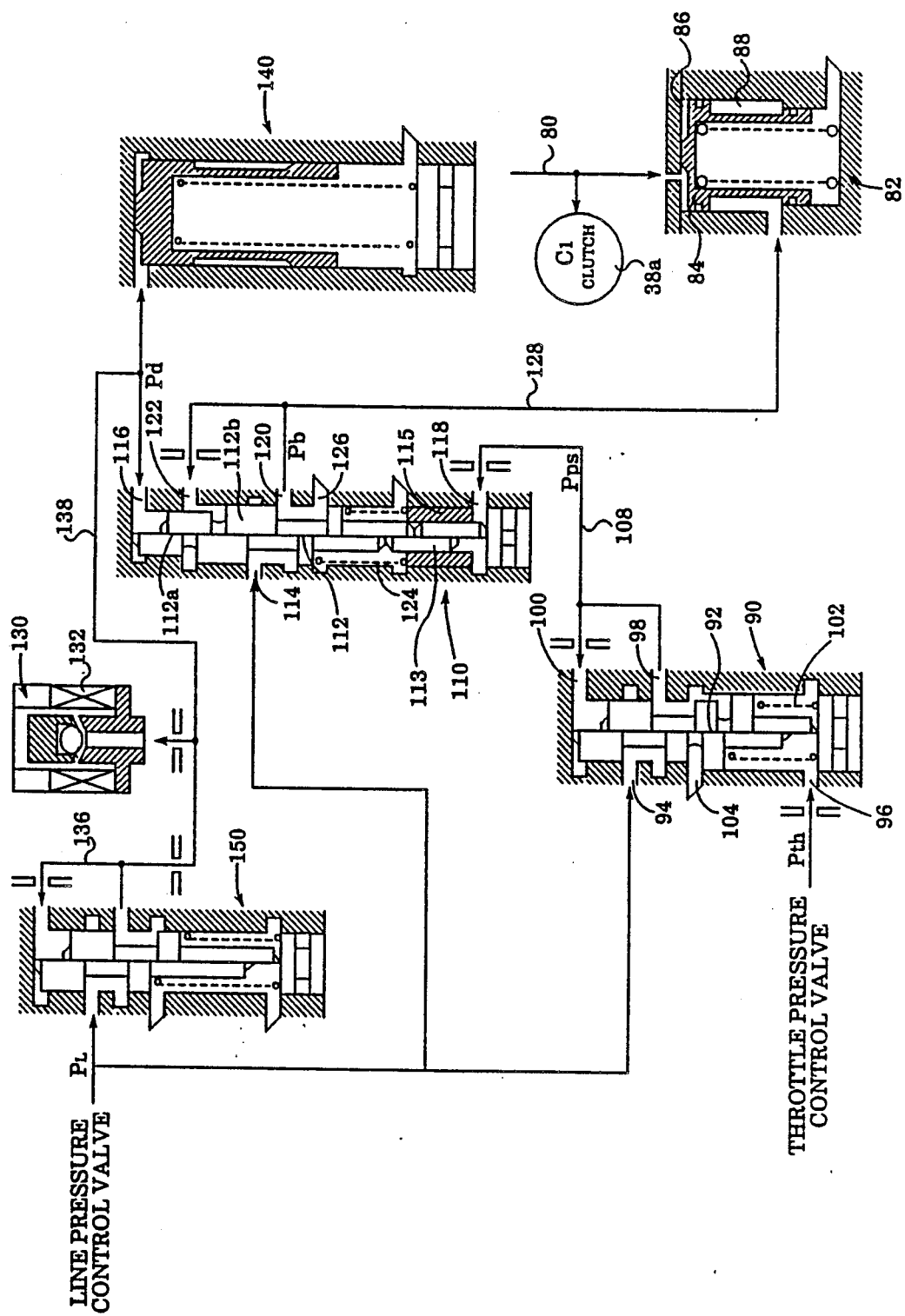
FIG. 2 is a schematic diagram showing an embodiment of the hydraulic control device including the accumulator control device according to the present invention.

As shown in FIG. 2, a hydraulic pressure chamber 38a of the first clutch 38 is selectively supplied with a hydraulic pressure through a passage 80 from a speed stage control valve not shown in the figure according to a switching over operation thereof, and an accumulator 82 is connected to the passage 80.

The accumulator 82 is of a common construction having an accumulator piston 84, an accumulator chamber 86 and a back pressure chamber 88, and adapted to provide an accumulator function of controlling the rising rate of hydraulic pressure in the hydraulic pressure chamber 38a with a characteristic controllable according to the hydraulic pressure supplied to the back pressure chamber 88. The back pressure chamber 88 is adapted to be supplied with an accumulator back pressure control hydraulic pressure through a passage 128 from an output port 120 of an accumulator control valve 110.

The accumulator control valve 110 has a spool element 112, an input port 114 adapted to be supplied with the so-called line pressure generated by a line pressure control valve of the conventional type not shown in the figure as a hydraulic pressure source, said output port 120 for outputting the accumulator back pressure control hydraulic pressure, a drain port 126, a first signal port 116 adapted to be supplied with a signal hydraulic pressure modulated by an electromagnetic valve 130 constructed as a solenoid type duty ratio control valve, a second signal port 118 adapted to be supplied through a passage 108 with an engine load dependent backup control hydraulic pressure which is an engine power simulation hydraulic pressure generated at a port 98 of an engine power simulation pressure control valve 90, a feed back port 122 supplied with the hydraulic pressure in said output port 120, a compression coil spring 124 and a plug 113, and is so adapted that along with movement of the spool element 112 upward in the figure, the degree of connection of the output port 120 with the input port 114 is increased while the degree of the connection of the output port 120 with the drain port 126 is decreased, and along with movement of the spool element 112 downward in the figure, the degree of connection of the output port 120 with the drain port 126 is increased while the degree of connection of the output port 120 with the input port 114 is decreased, thereby modulating the hydraulic pressure in the output port 120 in accordance with the up and down movement of the spool element in the figure. The spool element 112 has a small diameter land portion 112a and a large diameter land portion 112b. The small diameter land portion 112a has a first pressure receiving portion exposed to the signal hydraulic pressure in said first signal port 116 so as thereby to bias the spool element downward in the figure. The spool element 112 has a second pressure receiving portion between the small diameter land portion 112a and the large diameter land portion 112b exposed to the hydraulic pressure in the feed back port 112 so as thereby to be biased also downward in the figure. The pressure receiving area of said second pressure receiving portion is the difference between the cross sectional area $A_2$ of the large diameter land portion 112b and the cross sectional area $A_1$ of the small diameter land portion 112a, that is $A_2 - A_1$.

The plug 113 is provided on one axial side of the spool element 112 remote from the small diameter land portion 112a and is exposed to the hydraulic pressure supplied to the second signal port 118 so as thereby to bias the spool element 112 upward in the figure. The plug 113 has a cross sectional area $A_3$ which is smaller than the cross sectional area $A_2$ of the large diameter land portion 112b and is approximately equal to the pressure receiving area of the spool element 112 exposed to the feed back port 122, that is the pressure receiving area $A_2 - A_1$ of said second pressure receiving portion. As the diameter of the plug 113 is smaller than that of the large diameter land portion 112b of the spool element 112, the plug 113 is supported in the valve body via a sleeve 115. The compression coil spring 124 is provided between the sleeve 115 and the spool element 112 so as to bias the spool element 112 upward in the figure.

The engine power simulation pressure control valve 90 has a spool element 92, an input port 94 adapted to be supplied with the line hydraulic hydraulic pressure, a signal port 96 adapted to be supplied the so-called throttle pressure from a throttle pressure control valve of the conventional construction not shown in the figure as a signal hydraulic pressure reflecting engine output power, an output port 98 for outputting the above-mentioned engine power simulation hydraulic pressure reflecting engine output power, a feed back port 100 supplied with the hydraulic pressure in the output port 98, a drain port 104 and a compression coil spring 102, wherein the spool element 92 moves up and down in the figure according to the balance between the throttle hydraulic pressure supplied to the signal port 96 plus the spring force of the compression coil spring 102 and the hydraulic pressure supplied to the feed back port 100, so as to provide said engine power simulation hydraulic pressure in the port 98 as modulated from the line hydraulic pressure according to the degree of the connection between the port 98 with the port 94.

By denoting the pressure receiving area of the spool element 92 exposed to the throttle hydraulic pressure Pth supplied to the signal port 96 by $A_5$, the pressure receiving area of the spool element 92 exposed to the hydraulic pressure supplied to the feed back port 100 by $A_4$, and the spring force applied by the compression coil spring 102 to the spool element 92 by $F_1$, the engine power simulation hydraulic pressure Pps modulated by the engine power simulation pressure control valve 90 is expressed by the following formula:

$$Pps = (A_5 Pth + F_1)/A_4 \qquad (1)$$

Figure 3:
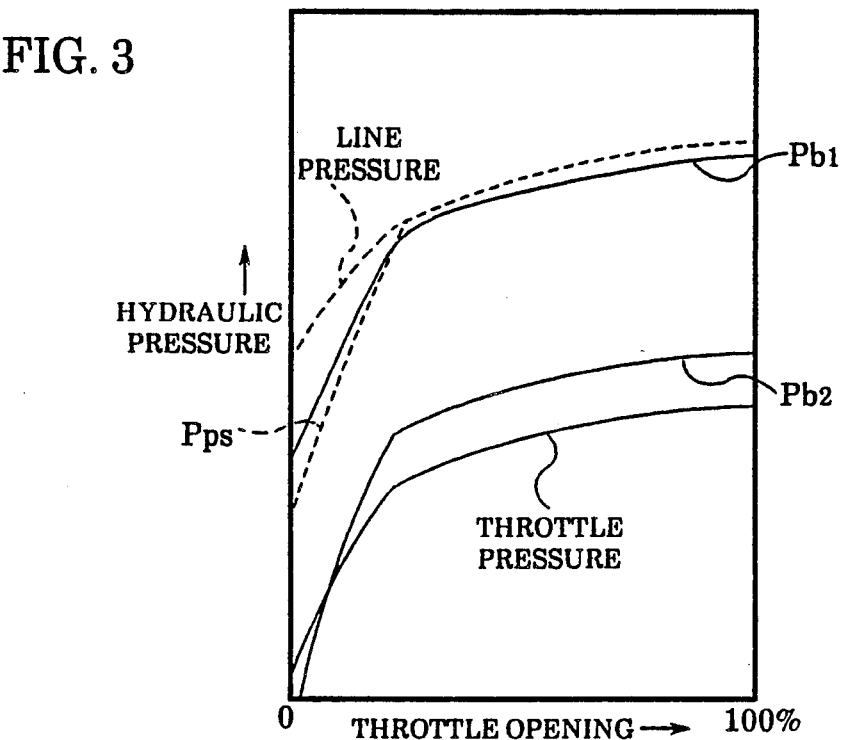
FIG. 3 is a graph showing the characteristics of the line hydraulic pressure, the throttle hydraulic pressure, the first accumulator control hydraulic pressure and the accumulator back pressure control hydraulic pressure relative to the throttle opening.
Figure 4:
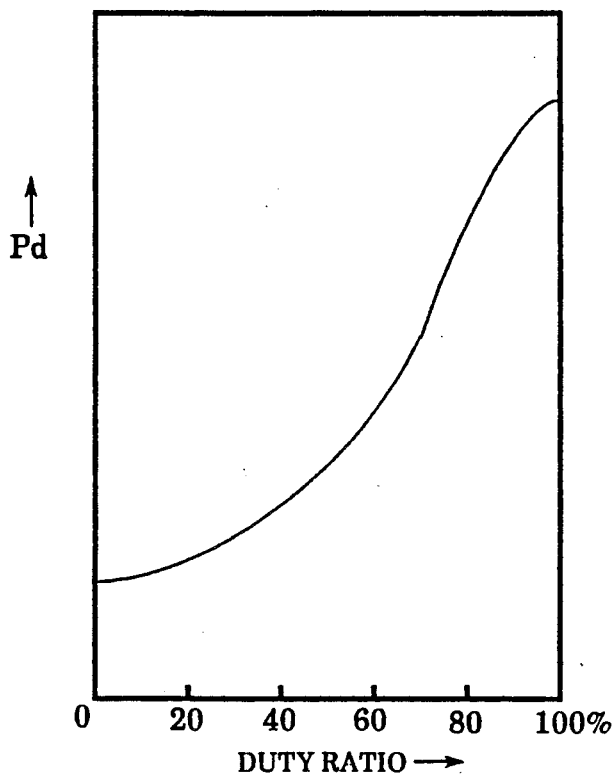
FIG. 4 is a graph showing the characteristic of the duty hydraulic pressure relative to the duty ratio.

The throttle pressure control valve not shown in the figure and referred to as a conventional one generates the throttle hydraulic pressure Pth which varies in accordance with throttle opening as shown in FIG. 3. The line hydraulic pressure control valve not shown in the figure and also referred to as a conventional one generates the line pressure PL which increases in accordance with increase of engine output power as shown in FIG. 3. The duty solenoid valve 130 is a normally open type electromagnetic drain valve which is supplied with a constant hydraulic pressure through a passage 136 from a modulator valve 150, and provides through a passage 138 a duty hydraulic pressure which varies in accordance with the duty ratio of a pulse electric signal supplied to an electromagnetic coil 132 thereof as a result of closing and opening thereof following the duty ratio of the pulse signal. The duty hydraulic pressure increases along with increase of the duty ratio as shown in FIG. 4. An accumulator type damper 140 is connected to the passage 138 for the purpose of damping the pulsation of the duty hydraulic pressure in the passage 138.

In the following the operation of the accumulator control device according to the present invention will be described. The modulation of hydraulic pressure by the accumulator control valve 110 is expressed by the following formula:

$$Pb = (A_3 \cdot Pps + F_2 - A_1 \cdot Pd)/(A_2 - A_1) \quad (2)$$

Wherein,
Pb: accumulator back pressure control hydraulic pressure
Pps: engine power simulation hydraulic pressure
$F_2$: spring force of compression coil spring 124
Pd: duty hydraulic pressure When $A_3$ is generally equal to $A_2 - A_1$ as described above, the above equation is developed to:

$$Pb = Pps + \{F_2/(A_2 - A_1)\} - \{A_1 \cdot Pd/(A_2 - A_1)\} \quad (3)$$

As is understood from equation (3), the accumulator back pressure control hydraulic pressure Pb is generated as modulatingly decreased from the engine power simulation hydraulic pressure Pps in accordance with the duty hydraulic pressure Pd. Thus the accumulator back pressure control can be optionally finely carried out by the duty ratio control of the duty solenoid valve 130 based upon the engine power simulation hydraulic pressure.

When the duty solenoid valve 130 is a normally open type valve and is put off, the duty hydraulic pressure Pd lowers to its minimum pressure level, and in accordance with this the accumulator back pressure control hydraulic pressure Pb will vary to follow the engine power simulation hydraulic pressure Pps, that is, the accumulator back pressure control hydraulic pressure Pb varies as shown by line $Pb_1$ in FIG. 3 to show its highest pressure level performance at each corresponding throttle opening or engine output power. In FIG. 3 the line denoted by $Pb_2$ shows a performance curve of the accumulator back pressure control hydraulic pressure Pb when the duty solenoid valve 130 operates at 100% duty ratio.

Thus, even when the duty solenoid valve 130 has failed due to a disconnection of the wire, etc., the accumulator back pressure control hydraulic pressure Pb varies at least in accordance with engine output power, showing its maximum value corresponding to engine output power, provided that the duty solenoid valve 130 is a normally open type, thereby avoiding any large shock to occur in a speed stage shifting due to a deficiency of accumulator capacity.

The engine power simulation hydraulic pressure Pps shows a pressure level reduced from the line hydraulic pressure PL to follow the throttle hydraulic pressure Pth as determined by equation (1) until it reaches the line hydraulic pressure at a certain throttle opening as shown in FIG. 3, and when the throttle opening increases beyond said throttle opening, the engine power simulation hydraulic pressure Pps is substantially equal to the line hydraulic pressure. Therefore, the engine power simulation hydraulic pressure Pps represents engine output power more faithfully than the line hydraulic pressure.

Thus, by backing up the control of the accumulator back pressure control hydraulic pressure Pb according to the duty ratio control with the engine power simulation hydraulic pressure Pps, the range of effective control of the accumulator back pressure control is increased, while it is ensured that the accumulator back pressure control hydraulic pressure Pb is controlled to reflect at least engine output power when the duty solenoid valve 130 has failed. By this arrangement the accumulator can operate effectively over the entire operational region of the engine so as thereby to effectively suppress speed stage shifting shocks to occur.

Figure 5:
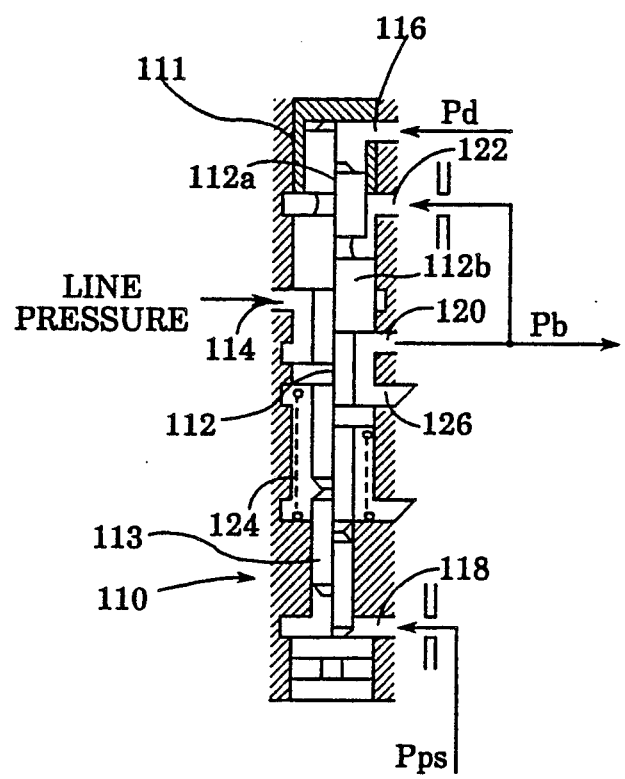
FIG. 5 is a schematic view of a modification of the accumulator control valve incorporated in the accumulator control device shown in FIG. 2.

FIG. 5 shows a modification of the accumulator control valve 110. In FIG. 5 the portions corresponding to those shown in FIG. 2 are designated by the same reference numerals as in FIG. 2. In this modification, instead of the sleeve 115 a sleeve 111 is provided on a side of the small land portion 112a of the spool element 112, so that the mounting of the spool element 112 into the valve body is carried out from the side of the sleeve 111. Also in this modification the pressure receiving areas of the respective pressure receiving portions are arranged as in the accumulator control valve shown in FIG. 2, so that the same functions and effects are available as in the accumulator control valve shown in FIG. 2.

In both of the accumulator control valves shown in FIGS. 2 and 5 the duty solenoid hydraulic pressure Pd is supplied to the first signal port 116, and the feed back port 122 is a middle port. However, the feed back port 112 may be operated as the first signal port to be supplied with the duty solenoid hydraulic pressure Pd, with the first signal port 116 being operated as the feed back port to be supplied with the hydraulic pressure from the output port 120. In such a case the cross sectional area $A_1$ of the small land portion 112a will have to be made equal to the cross sectional area $A_3$ of the plug 113.

Although in the shown embodiment the second signal port 118 of the accumulator control valve 110 is supplied with the engine power simulation pressure generated by the engine power simulation pressure control valve 90, the second signal port may be supplied with the line hydraulic pressure by omitting the engine power simulation pressure control valve. In such a simplified construction the comparability between the area $A_2 - A_1$ and the area $A_3$ is laid under the same condition, because the engine power simulation pressure and the line hydraulic pressure are substantially of the same pressure level except the partial modification applied on the line hydraulic pressure by the engine power simulation pressure control valve 90 in low engine output power operation. Further, the second signal port 118 of the accumulator control valve 110 may be supplied with the throttle hydraulic pressure. In such a construction the comparability between the area $A_2 - A_1$ and the area $A_3$ will have to be modified according to the difference in the general pressure level between the line hydraulic pressure and the throttle hydraulic pressure.

Although the invention has been described in detail with respect to a preferred embodiment thereof, it will be clear to those skilled in the art that various modifications with respect to the embodiment are possible without departing from the spirit of the present invention.

TABLE 1

|  | $C_1$ 38 | $C_2$ 40 | $C_3$ 42 | $C_4$ 44 | $B_1$ 46 | $B_2$ 48 | $F_1$ 34 | $F_2$ 36 |
|---|---|---|---|---|---|---|---|---|
| 1st Speed Stage | 0 |  |  |  |  | (0) | 0 | 0 |
| 2nd Speed Stage | 0 |  |  | 0 | (0) |  |  | 0 |
| 3rd Speed Stage | 0 | 0 |  | 0 |  |  | 0 |  |
| 4th Speed Stage |  | 0 |  | 0 | 0 |  |  |  |
| Reverse Stage |  |  | 0 |  |  |  | 0 |  |

TABLE 2

|  | Speed Change Gear Ratio |
|---|---|
| 1st Speed Stage | $(1+r_2)/r_2$ |
| 2nd Speed Stage | $\{(1+r_2)/r_2\} - \{1/r_2(1+r_1)\}$ |
| 3rd Speed Stage | 1 |
| 4th Speed Stage | $1/(1+r_1)$ |
| Reverse Stage | $-1/r_1$ |

We claim:

1. A hydraulic control device for an accumulator in a speed stage shifting device of an automatic transmission for a vehicle such as an automobile, comprising:
an electromagnetic valve means for generating a first hydraulic pressure having a pressure level characteristic for primarily determining a second hydraulic pressure to be supplied to a back pressure chamber of said accumulator according to an electric signal supplied thereto, said electromagnetic valve means decreasing the pressure level of said first hydraulic pressure substantially to zero when it fails to operate; and
an accumulator control valve means for generating said second hydraulic pressure to be supplied to the back pressure chamber of said accumulator by modulating a source of hydraulic pressure therefor according to a balance between said second hydraulic pressure itself and a third hydraulic pressure available in said automatic transmission as having a pressure level characteristic increasing or decreasing along with an increase or decrease of engine output power, under an influence of said first hydraulic pressure, so that said second hydraulic pressure increases or decreases along with an increase or decrease of said third hydraulic pressure under said influence of said first hydraulic pressure, wherein said accumulator control valve has a spool element having a first pressure receiving area exposed to said second hydraulic pressure to provide a positive feed back effect of decreasing said second hydraulic pressure along with an increase thereof and a second pressure receiving area exposed to said third hydraulic pressure, said first pressure receiving area having an effective pressure responsive sectional area which generates a first force under said second hydraulic pressure, said second pressure receiving area having an effective pressure responsive sectional area which generates a second force substantially equal in the magnitude thereof and opposite in the orientation thereof to said first force under said third hydraulic pressure.

2. A hydraulic control device for an accumulator according to claim 1, wherein said electromagnetic valve is a normally open type solenoid valve which generates said first hydraulic pressure from a source hydraulic pressure therefor so as to increase along with an increase of a duty ratio of energization thereof, and said accumulator control valve modulates said source hydraulic pressure therefor so as to decrease or increase the pressure level of said second hydraulic pressure along with increase or decrease of the pressure level of said first hydraulic pressure.

3. A hydraulic control device for an accumulator according to claim 1, further comprising an engine power simulation pressure control valve means for generating said third hydraulic pressure as modulated from a line hydraulic pressure available in said automatic transmission as having a pressure level characteristic of increasing or decreasing along with increase or decrease of engine output power according to a throttle pressure available in said automatic transmission as having a pressure level characteristic of increasing or decreasing along with increase or decrease of engine output power so that said third hydraulic pressure increases or decreases at higher rate along with increase or decrease of engine output power than said line hydraulic pressure in low engine output power operation.

4. A hydraulic control device for an accumulator according to claim 3, wherein said source hydraulic pressure for generating said second hydraulic pressure is said line pressure, and said effective pressure responsive sectional area of said first pressure receiving area is substantially equal in the magnitude thereof and opposite in the orientation thereof to said effective pressure responsive sectional area of said second pressure receiving area.

* * * * *